(12) United States Patent
Kodama et al.

(10) Patent No.: US 11,607,811 B2
(45) Date of Patent: Mar. 21, 2023

(54) INFORMATION PROVIDING DEVICE, INFORMATION PROVIDING METHOD AND PROGRAM

(71) Applicant: FUJI CORPORATION, Chiryu (JP)

(72) Inventors: Seigo Kodama, Yatomi (JP); Masatoshi Fujita, Anjo (JP)

(73) Assignee: FUJI CORPORATION, Chiryu (JP)

( * ) Notice: Subject to any disclaimer, the term of this patent is extended or adjusted under 35 U.S.C. 154(b) by 310 days.

(21) Appl. No.: 16/771,862

(22) PCT Filed: Dec. 28, 2017

(86) PCT No.: PCT/JP2017/047218
§ 371 (c)(1),
(2) Date: Jun. 11, 2020

(87) PCT Pub. No.: WO2019/130542
PCT Pub. Date: Jul. 4, 2019

(65) Prior Publication Data
US 2021/0170598 A1    Jun. 10, 2021

(51) Int. Cl.
*B25J 9/16*    (2006.01)
(52) U.S. Cl.
CPC ........... *B25J 9/1671* (2013.01); *B25J 9/1661* (2013.01); *B25J 9/1664* (2013.01)
(58) Field of Classification Search
CPC ...... B25J 9/1605; B25J 9/1671; B25J 9/1664; B25J 9/1661
USPC .................................................. 700/245–264
See application file for complete search history.

(56) References Cited

U.S. PATENT DOCUMENTS

| 6,944,584 | B1 | 9/2005 | Tenney et al. | |
| 9,272,418 | B1* | 3/2016 | Guerin | B25J 9/1628 |
| 9,586,315 | B2* | 3/2017 | Guerin | B25J 9/1661 |
| 10,173,319 | B1* | 1/2019 | Jules | B25J 9/1661 |
| 10,399,220 | B2* | 9/2019 | Guerin | B25J 9/161 |
| 10,510,267 | B2* | 12/2019 | Jarc | G09B 23/285 |

(Continued)

FOREIGN PATENT DOCUMENTS

| CN | 107530879 A | 1/2018 |
| DE | 10 2010 004 477 A1 | 7/2011 |

(Continued)

OTHER PUBLICATIONS

International Search Report dated Apr. 3, 2018 in PCT/JP2017/047218 filed Dec. 28, 2017, 2 pages.

*Primary Examiner* — Jonathan L Sample
(74) *Attorney, Agent, or Firm* — Oblon, McClelland, Maier & Neustadt, L.L.P.

(57) ABSTRACT

An information providing device has an operation program using information on a structure related to a work robot and information on a processing model related to the structure to execute processing of the processing model by the structure in a virtual space. In addition, the information providing device includes a control section for acquiring data of a development target object including at least one of a new structure and a new processing model from an information processing device used by a developer, executing the operation program using the acquired data of the development target object to execute processing by the development target object in the virtual space, and outputting a processing result by the development target object.

13 Claims, 9 Drawing Sheets

(56) References Cited

U.S. PATENT DOCUMENTS

| | | | |
|---|---|---|---|
| 10,571,902 B2* | 2/2020 | Aldridge | B25J 9/1664 |
| 2007/0021868 A1* | 1/2007 | Nagatsuka | G05B 19/416 |
| | | | 700/245 |
| 2007/0293986 A1 | 12/2007 | Nagatsuka et al. | |
| 2008/0114492 A1 | 5/2008 | Miegel et al. | |
| 2011/0087373 A1* | 4/2011 | Nagatsuka | B25J 9/1674 |
| | | | 901/50 |
| 2012/0327224 A1 | 12/2012 | Nomura et al. | |
| 2018/0178379 A1* | 6/2018 | Takeda | B25J 9/1671 |
| 2019/0015980 A1* | 1/2019 | Kojima | B25J 9/1671 |
| 2019/0160678 A1* | 5/2019 | Zhang | B25J 9/1664 |

FOREIGN PATENT DOCUMENTS

| | | |
|---|---|---|
| EP | 3 226 196 A1 | 10/2017 |
| JP | 7-214485 A | 8/1995 |
| JP | 2007-334678 A | 12/2007 |
| JP | 2011-186928 A | 9/2011 |
| JP | 2012-56002 A | 3/2012 |
| JP | 2015-100866 A | 6/2015 |
| WO | WO 2016/185590 A1 | 11/2016 |

\* cited by examiner

INFORMATION PROVIDING DEVICE, INFORMATION PROVIDING METHOD AND PROGRAM

TECHNICAL FIELD

In the present specification, an information providing device, an information providing method, and a program are disclosed.

BACKGROUND ART

Conventionally, as a method of constructing a manufacturing system for performing work on a workpiece, there has been proposed a method of preparing a main body device having a main frame and a control device, and a working element execution device, and then assembling the working element execution device to the main frame of the main body device, by which the control device is set to control the working element execution device in an integrated manner (for example, refer to Patent Literature 1). With this construction method, it is possible to construct a manufacturing system having high versatility.

PATENT LITERATURE

Patent Literature 1: JP-A-2012-56002

BRIEF SUMMARY

Technical Problem

Incidentally, for example, in a work robot or the like, a structure such as an end effector for working on a workpiece is provided, and it is necessary to sequentially develop the end effector in accordance with the type of the workpiece and the type of the processing for the workpiece. When an attempt is made to develop a work robot that performs a specific work on a specific workpiece, the engineer creates a design drawing and manufactures a prototype structure from the design drawing to check that its operation and functions are sufficient. However, the development of such a structure is not readily to perform because it requires high skills in the art. Moreover, the development of such a structure has been carried out for each engineer (end user), which turns out the developed resources being not effectively utilized.

The present disclosure has been made in view of such problems, and a main object thereof is to provide an information providing device, an information providing method, and a program, which can develop more easily a structure used for a work system.

Solution to Problem

The present disclosure employs the following means in order to achieve the above-mentioned main object.

The information providing device of the present disclosure is an information providing device used in a work system including a work robot that performs a predetermined work on a workpiece, the information providing device includes: an operation program, using information on a structure related to the work robot and information on a processing model related to the structure, which enables to execute processing of the processing model by the structure in a virtual space; and a control section for acquiring data of a development target object including at least one of a new structure and a new processing model from an information processing device used by a developer, executing the operation program, using the acquired data of the development target object, which executes processing by the development target object in the virtual space, and outputting a processing result by the development target object.

The information providing device has an operation program for executing processing of a processing model by a structure in the virtual space using information on a structure related to a work robot and information on a processing model related to the structure. In the information providing device, data of a development target object including at least one of a new structure and a new processing model is acquired from an information processing device used by a developer, processing by the development target object is executed in the virtual space by an operation program using the acquired data of the development target object, and a processing result by the development target object is output. Developers can check in the virtual space how a development target object executes processing based on the output processing result without actually producing a structure. Therefore, in this information providing device, development of a structure and a processing model used for a work system can be more easily executed. Here, the "structure" includes, for example, a part or all of the work robot, a member mounted on the work robot, a member disposed around the work robot, and the like. Further, the "processing result" includes, for example, the operation of the structure and the state of the captured image, and the determination result in the image processing, specifically, at least one of the presence or absence of interference between the work robots (structures) to each other, whether pick-up, holding, or movement of the workpiece is possible, the presence or absence of dropping of the workpiece, the image quality of the captured image, and the accuracy of the image processing may be included. The control section may output the processing result from an information providing device or an information processing device used by a developer.

DESCRIPTION OF EMBODIMENTS

Figure 1:
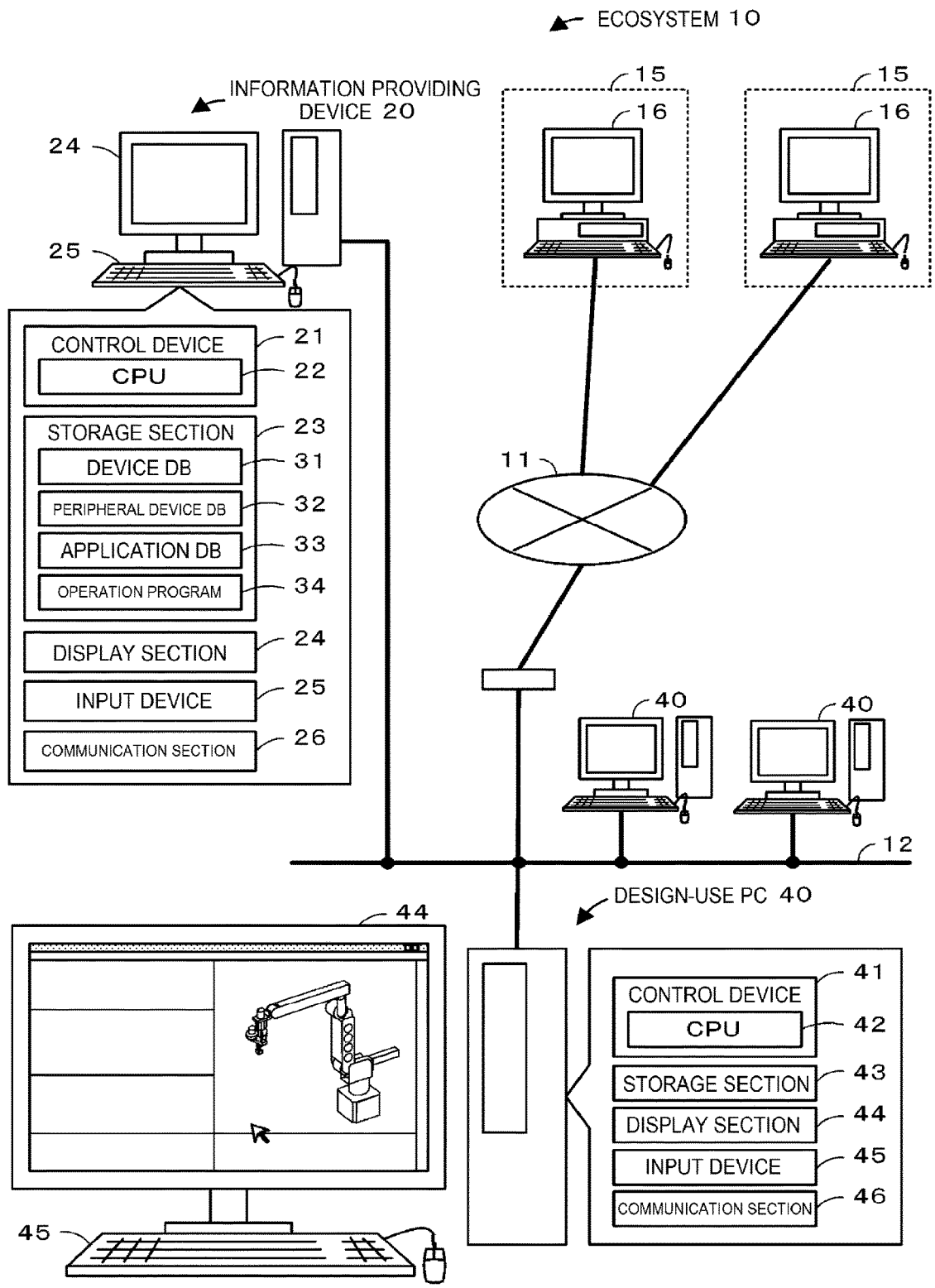
FIG. 1 is a schematic explanatory view illustrating an example of an ecosystem 10.
Figure 2:
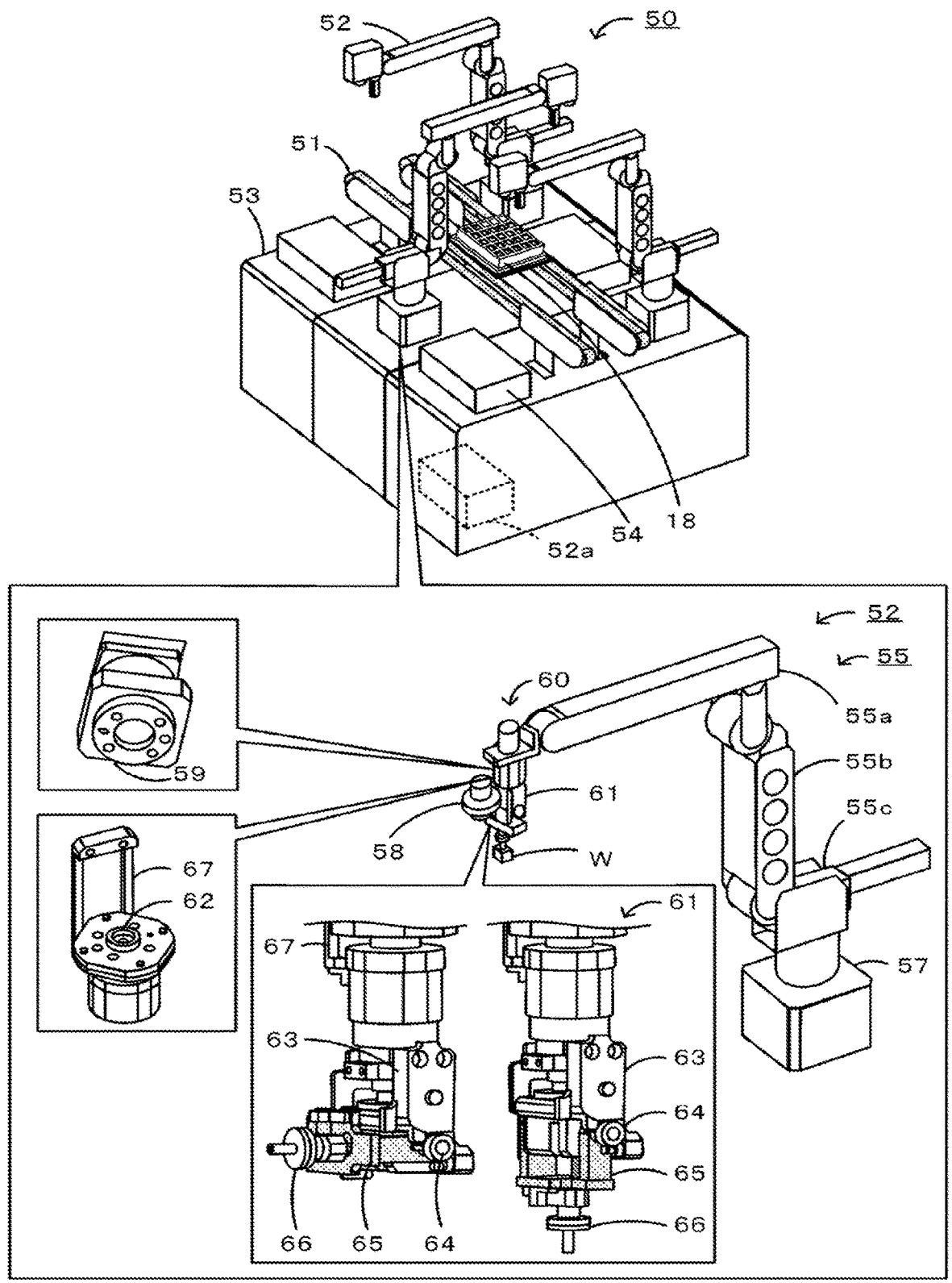
FIG. 2 is a perspective view illustrating an example of a work system 50.
Figure 3:
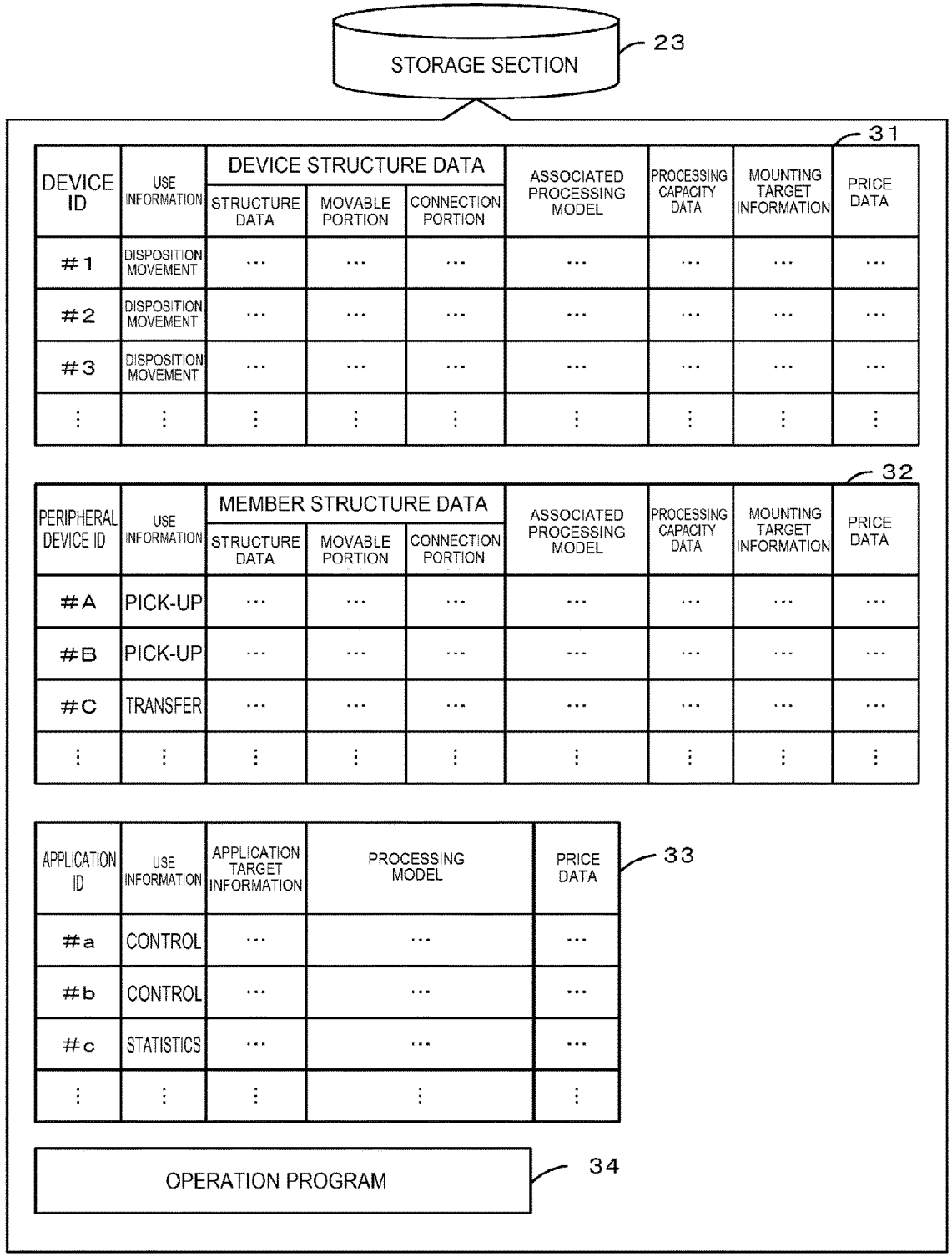
FIG. 3 is an explanatory view of information stored in a storage section 23.

Preferred embodiments of an information providing device 20 disclosed in the present specification will be described below with reference to the drawings. FIG. 1 is a schematic explanatory view of an ecosystem 10 including the information providing device 20. FIG. 2 is a perspective view illustrating an example of a work system 50 that performs predetermined processing on a workpiece W. FIG. 3 is an explanatory view of a device database (DB) 31, a peripheral device DB 32, and an application DB 33 stored in a storage section 23. The ecosystem 10 is an information providing system providing information on the work system 50, and as illustrated in FIG. 1, includes a shop personal computer (PC) 16 connected to a network 11 such as the Internet, the information providing device 20 connected to a LAN 12, and multiple design-use PCs 40 connected to the LAN 12.

The shop PC 16 is disposed in a shop 15 operated by a company that runs the ecosystem 10. The shop PC 16 provides information on the work system 50 to customers and the like considering introducing the work system 50. In the shop 15, for example, an explainer who understands the technique of the work system 50 is disposed, and the shop PC 16 is operated by the explainer. The shop PC 16 includes a control device including a CPU and the like, a storage section, a display section, an input device, and a communication section. The shop PC 16 exchanges data with the information providing device 20 through the network 11 and the LAN 12.

The information providing device 20 is configured as a server that handles information on a work system including a work robot that performs a predetermined work on the workpiece W. The information providing device 20 receives orders and delivers, for example, the work system 50, an arrangement device 52, and peripheral devices disposed in the vicinity thereof, and performs processing for registering a newly developed development target object in the ecosystem 10. The development target object includes not only structures such as devices and peripheral devices used in the work system 50, but also a processing model related to the structures and control software (applications) for executing the processing model. The information providing device 20 transmits data to the design-use PC 40 and receives information from the design-use PC 40 through the LAN 12. The information providing device 20 transmits data to the shop PC 16 and receives information from the shop PC 16 through the network 11. The information providing device 20 includes a control device 21 for controlling the entire device, the storage section 23 for storing various application programs and various data files, a display section 24 for displaying various information, an input device 25 such as a keyboard and a mouse for inputting various commands by an operator, and a communication section 26 for communicating with external devices such as the design-use PC 40. The control device 21 is configured as a microprocessor centered on a CPU 22. The communication section 26 is a network interface for communicating with an external device.

Here, the work system 50 will be described. As illustrated in FIG. 2, the work system 50 includes the arrangement device 52 as a work robot that performs a predetermined processing on a processing target object (workpiece W). The work system 50 includes a conveyance device 51 for conveying a disposing member 18 such as a pallet for arranging the workpiece W, at least one arrangement devices 52, a supply device 54 for supplying the workpiece W, and a control device 52a for controlling the device. Here, an example in which the work system 50 performs the operation of moving the workpiece W from a supply position to the disposing member 18 will be described. The workpiece W as a work target is not particularly limited, and examples thereof include various components such as mechanical components, electric components, electronic components, chemical components, and the like, as well as food, bio- and biological-related articles, and the like. The predetermined work includes, for example, a moving work of picking, moving, and disposing from a supply position to a destination, an assembling work of assembling components, a processing work of performing processing, an application work of applying a viscous material, a heating work of heating, a processing work of performing chemical and/or physical predetermined processing, and an inspection work of performing inspection. The arrangement device 52 is configured as an articulated arm robot, and includes a base 53, an arm member 55, an end effector 60, and a pedestal section 57. The base 53 is a rectangular parallelepiped member having a connecting section connected to an adjacent device (such as arrangement device 52), and is provided with the arm member 55, other devices (conveyance device 51 and supply device 54), and the like on the upper section thereof. The arm member 55 has a first the arm member 55a, a second the arm member 55b, and a third support section 55c. The end effector 60 is removably disposed at the tip end of the arm member 55. On the lower face side of the end effector 60, an imaging device 58 used for recognition of a processing target and the direction change pickup section 61 for gripping and picking up the workpiece W are disposed.

The direction change pickup section 61 is a peripheral device connected to the work robot and will be described below as being a newly developed target object. The direction change pickup section 61 is a structure that is driven using the pressure (negative pressure, positive pressure or atmospheric pressure) supplied from the articulated robot 20 to pick up the workpiece W, and performs arrangement processing after changing the direction of the picked up workpiece W. The direction change pickup section 61 includes a connecting section 62, a first member 63, a rotation shaft 64, a second member 65, a pickup member 66, and an external pipe 67. The connecting section 62 is a connection portion for connecting a connecting section 59 disposed at the tip end of the arm member 55, and is formed in a standardized connection method and size. The first member 63 is a member fixed below the connecting section 62, and the rotation shaft 64 is disposed on the tip end side of thereof. The second member 65 is a member which is pivotally supported by the rotation shaft 64 below the first member 63, and is driven by a driving section (not illustrated) to rotate about the rotation shaft 64. The pickup member 66 is a suction nozzle for picking up the workpiece W by the supplied negative pressure, and is mounted at the tip end of the second member 65 in a detachable state. The external pipe 67 is a pressure port for inputting the pressure supplied from the arm member 55 and is fixed to the side of the connecting section 62. In the direction change pickup section 61, the movement trajectory of the tip end of the pickup member 66 is an arc, and the picked up the workpiece W is rotated in a range of 0° to 90°, such as a vertical state to a horizontal state. The pickup member 66 may be a mechanical chuck for gripping the workpiece W, in addition to the suction nozzle.

As illustrated in FIGS. 1 and 3, the storage section 23 of the information providing device 20 stores the device DB 31, the peripheral device DB 32, the application DB 33, an operation program 34, and the like. The device DB 31 is a data base including information on various devices handled by the information providing device 20. The device DB 31 includes device identification information (ID), use information on the device, device structure data including structure data such as an external shape of the device, information on a processing model associated with the device, processing capacity data including basic specifications of the device, mounting target information including information on items connectable to the device, price data relating to the price of the device, and the like. The work system 50 includes a device (main device) and a peripheral device as a structure. Examples of the main device include the arrangement device 52 and the base 53 as a work robot, and examples of the peripheral device include the conveyance device 51, the supply device 54, an end effector 56, the imaging device 58, and the like. The use of the device includes information that can roughly extract the functions of the device, and includes, for example, "disposition", "movement", "transfer", "fixation", "pick-up", "direction change", and the like. The device structure data includes structure data, movable portion data, connection portion data, and the like. The structure data is data for specifying the structure of each portion constituting the device by shape, size, material, and the like.

The structure data may further include shape data, structure condition data, material data, and the like. The shape data may be, for example, three-dimensional CAD data. The structure condition data may include, for example, information such as strength, Young's modulus, weight, conductivity, and insulation of the structure. The material data may include, for example, information on a material that is configured, for example, information on a resin, a metal, a ceramic, or the like. For example, in the arrangement device 52, the structure data includes information such as the skeleton of the first the arm member 55a, the skeleton of the second the arm member 55b, the shape of the connecting member for connecting the two, the structure condition, the material, and the like. The movable portion data includes, for example, the information on the movable range and the position and direction of the rotation shaft of the end effector 60, the rotation shaft of the first the arm member 55a, the rotation shaft of the second the arm member 55b, and the like, the information on the movable range and the position and direction of the rotation axis (vertical shaft) of the third support section 55c, and the like. The movable portion data defines, for example, a movable range and a movable direction of the arm member 55. The connection portion data includes, for example, information such as a standard, a position, and a size of a fixing portion of the pedestal section 57, a connection portion of the end effector 60, a connection portion of the direction change pickup section 61, and a connection portion of the imaging device 58. The connection portion data defines, for example, the connectable arrangement device 52, the direction change pickup section 61 and the imaging device 58 mountable to the end effector 60, and the like.

Information on the processing model includes, for example, at least one information on movement processing, pick-up processing, arrangement processing, direction conversion processing, incorporation processing, image capturing processing, and image processing, using the workpiece W. This processing model is defined in relation to the processing executed by the structure, and, for example, in the device, "transfer processing" is related to the conveyance device 51, and "movement processing, pick-up processing, and arrangement processing" is related to the arrangement device 52. Further, in the peripheral device, "pick-up processing" is related to the direction change pickup section 61, an "image capturing processing" is related to the imaging device 58, and "image processing" is related to the control section. Further, in each processing model, for example, the "image capturing processing" may include multiple processing concepts, such as still image imaging, moving image imaging, continuous imaging, and the like, and a processing condition and the like are set corresponding to each. The processing capacity data includes, for example, the size and mass of the workpiece W that can be processed, the operation speed and acceleration of the device, the pressure (pressurization, negative pressure) and load that can be applied to the workpiece, the usable current, voltage, amount of energy, and the like in the device. The mounting target information includes information on other devices connectable to the device and/or peripheral devices connectable to the device, for example, a device ID and a peripheral device ID. The mounting target information is set based on the connection portion data. The size, shape, movable range, processing content, and the like of the device are defined by the information included in the device DB 31.

The peripheral device DB 32 includes identification information (ID) of the peripheral device, use information on the peripheral device, member structure data including structure data such as an external shape of the peripheral device, information on processing model associated with the peripheral device, processing capacity data including basic specifications of the peripheral device, mounting target information including information on a device to which the peripheral device is connectable and/or other peripheral devices to which the peripheral device is connectable, price data on prices of the peripheral device, and the like. The information included in the peripheral device DB 32 is the same as the information included in the device DB 31 described above, and a detailed explanation of the information is omitted. The size, shape, movable range, processing content, and the like of the peripheral device are defined by the information included in the peripheral device DB 32.

The application DB 33 is a data base containing information on control software (applications) including a processing model used in devices and peripheral devices. The application DB 33 includes, for example, identification information (ID) of an application, use information of the application, application target information including information on a device and/or a peripheral device that is usable by the application, information on a processing model associated with the application, price data on a price of the peripheral device, and the like. The application is used for a structure such as a specific device or a peripheral device, and is produced and sold together with or separately from the structure. Specific examples of such an application include the control content of image capturing processing used in the specific imaging device 58. The application may be a traceability tool of a structure such as a device or a peripheral device used in the work system 50, an image processing data creation tool, an analysis tool, or the like. By applying the application included in the application DB 33 to the structure, the control of the structure with respect to a specific workpiece W or the like is optimized.

The operation program 34 is a program for executing an operation of a work system (operation of structure) in a virtual space by using information on a structure and information on a processing model related to the structure. The operation program 34 is a so-called simulation program that operates the structure in the processing of the processing model. The operation program 34 acquires information included in the device DB 31 and the peripheral device DB 32, executes the operation, and displays and outputs the execution result as, for example, a moving image in a state in which the peripheral device is mounted on the main device, a state in which the device and the device are connected, further in a combination thereof. At this time, the operation program 34 applies the processing condition applied to the structure and the processing model, and executes the processing of the processing model in the structure in the virtual space.

The design-use PC 40 is a computer for designing structures incorporated in the work system 50 illustrated in FIG. 2, for example, the arrangement device 52 as a work robot or a peripheral device mounted around the arrangement device 52. The design-use PC 40 is configured as an information processing device, and includes a control device 41 including a CPU 42 and the like, a storage section 43, a display section 44, an input device 45, and a communication section 46. The control device 41, the storage section 43, the display section 44, the input device 45, and the communication section 46 may be the same as those described for the information providing device 20. The design-use PC 40 exchanges data with the information providing device 20 through the LAN 12 and the communication section 46. Software such as three-dimensional CADs for creating three-dimensional data of main devices and peripheral devices is installed in the design-use PC 40. Depending on the skill of the developer, the three-dimensional CAD may handle data in a virtual processing format that can be handled by the information providing device 20, or it may handle data in a development format different from that of the virtual processing format.

Figure 4:
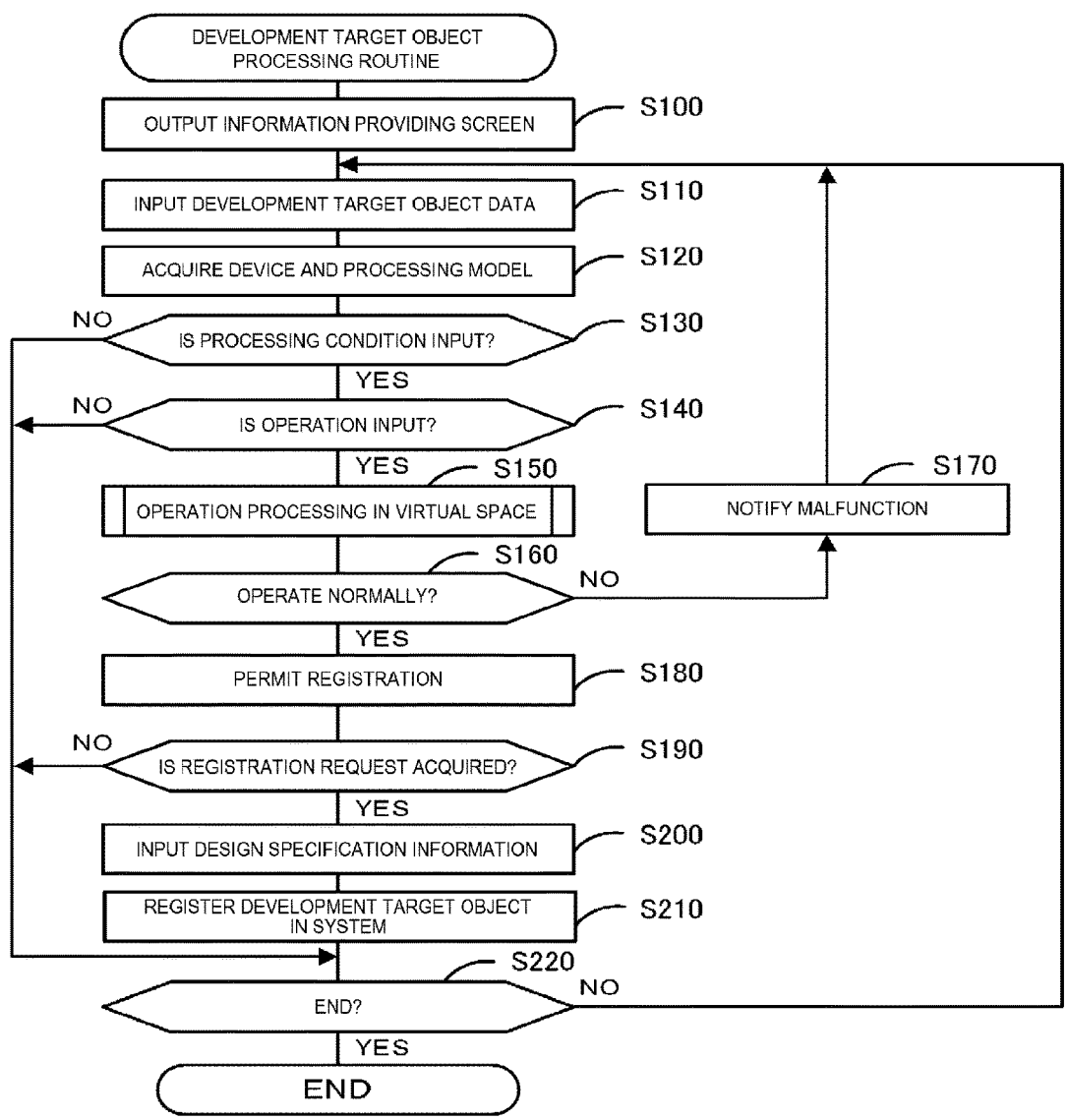
FIG. 4 is a flowchart illustrating an example of a development target object processing routine.

Next, the operation of the ecosystem 10 of the present embodiment, in particular, the processing of registering the development target object including the newly developed structure and the processing model in the ecosystem 10 by the developer will be described. Here, as a specific example, the processing in which the developer registers the direction change pickup section 61 to the ecosystem 10 will be mainly described. The developer develops a new end effector (the direction change pickup section 61) that meets the needs of the market as a development target object. First, the developer carries out design of the mechanism, pipe design, component selection, design of the connecting section, design of the electrical circuit, and the like in the conceptual design stage. As a specific function, the developer obtains the suction force of the workpiece W by calculation and designs the workpiece W to be compatible with the suction force, Next, the developer creates the CAD data based on the content of the concept design. The developer designs mechanic components, sets air flow paths, and sets members such as material, and use the design-use PC 40 to create CAD data. In addition, the developer sets the mechanism section connection condition including the link condition, the slip condition, and the like at the bonding portion of the structure. The developer sets the shape of the structure, the movable portion, the connection portion, and the like, and creates three-dimensional CAD data of the direction change pickup section 61. The developer prepares the three-dimensional CAD data of the development target object, and then verifies the processing operation in the virtual space by the operation program 34. FIG. 4 is a flowchart illustrating an example of a development target object processing routine executed by the CPU 22 of the information providing device 20. The routine is stored in the storage section 23 and executed in response to a start instruction by an operator (developer) of the design-use PC 40. When this routine is started, the CPU 22 of the control device 21 outputs an information providing screen 70 to the design-use PC 40 (step S100).

Figure 5:
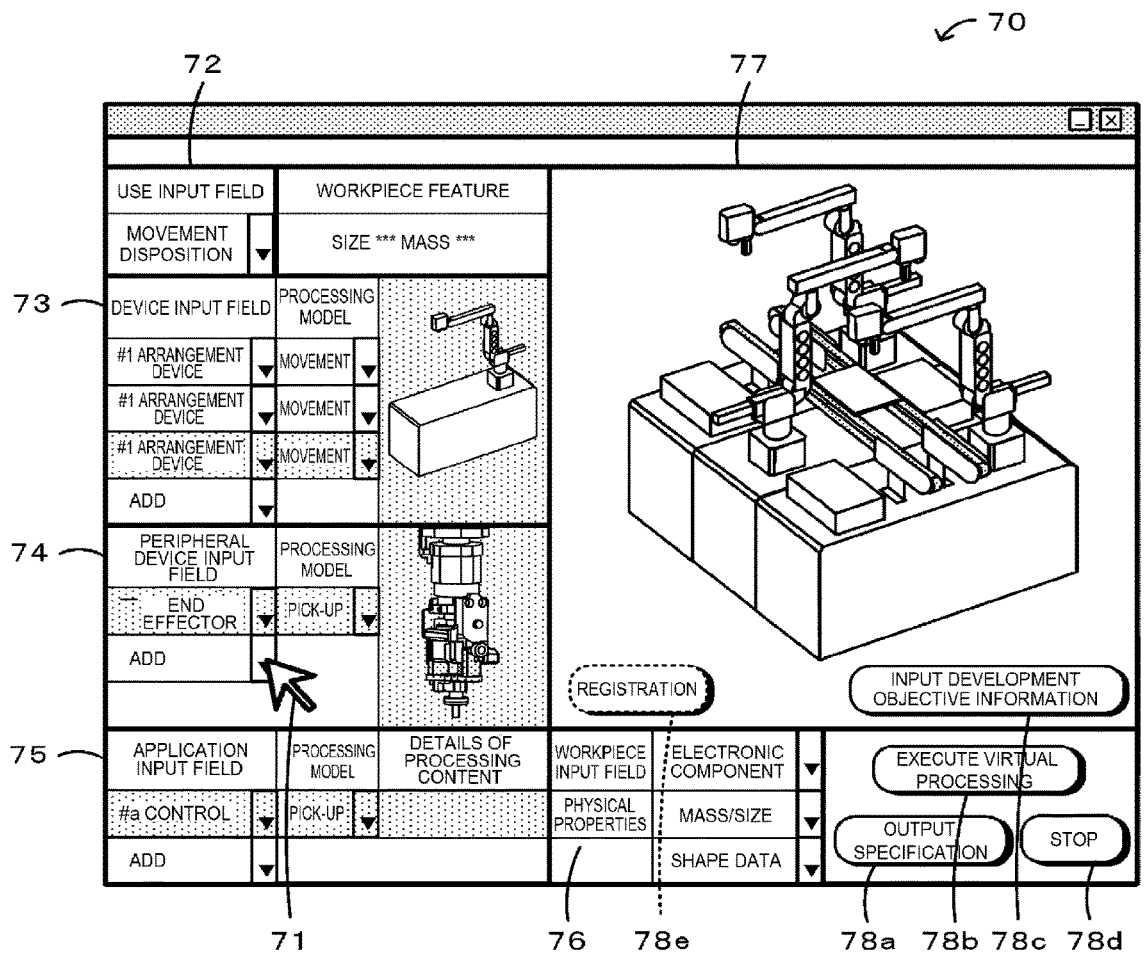
FIG. 5 is an explanatory view of an information providing screen 70.

FIG. 5 is an explanatory view illustrating an example of the information providing screen 70 displayed on the display section 44 of the design-use PC 40. The information providing screen 70 is a screen for providing information in sales of the work system 50, and is configured to be able to read out an existing device, a peripheral device, an application, or the like and apply the read-out existing device, peripheral device, or application to the development target object in the design-use PC 40. In the information providing screen 70, a cursor 71, a use input field 72, a device input field 73, a peripheral device input field 74, an application input field 75, a workpiece input field 76, an image display field 77, and the like are disposed. The cursor 71 is for an operator to select and input an input field disposed on the screen, and moves on the screen by operation of the input device 45, The use input field 72 is a field for inputting information that specifies the use of the system. When a use is input in the use input field 72, a device or a peripheral device compatible with the use is preferentially displayed on the information providing screen 70 based on the device DB 31 or the peripheral device DB 32. In the use input field 72 and other input fields, the selection items are displayed by a pull-down menu. In the information providing screen 70, when a specific item is input, the number of selected items increases, decreases, or changes in accordance with the input of the specific item. For example, when a device is specified, other devices that are connectable to the device are selectively displayed and non-connectable devices are non-selectable. When the size or mass of a workpiece is input, a device or a peripheral device which cannot handle the workpiece cannot be selected. The non-selectable mode may be, for example, deleted from the selected item or displayed in a non-selectable mode (gray display or the like). Such display control is performed based on information output from the information providing device 20, and may be executed by the control device 21 or the control device 41. The device input field 73 is a field for selecting and inputting a desired device. In the device input field 73, when a device is selected, a processing model associated with the device can be displayed, and an image of the device is displayed in a region adjacent to the input field. The peripheral device input field 74 is a field for inputting a peripheral device connected to the device. Also in the peripheral device input field 74, when a peripheral device is selected, a processing model associated with the peripheral device can be displayed, and an image of the peripheral device is displayed in a region adjacent to the input field. The application input field 75 is a field for selecting and inputting an application to be applied to a structure such as a device and a peripheral device. In the application input field 75, when an application is selected, a processing model associated with the application can be displayed, and details of the processing content are displayed in a region adjacent to the input field. The workpiece input field 76 is a field for inputting information on a workpiece to be handled, and, for example, the type of the workpiece, physical properties such as mechanical strength, mass, size, shape, and the like can be input. The image display field 77 is a field to be displayed in a state in which the selected device or peripheral device is connected and mounted. In the image display field 77, an image and a moving image of the work system 50 is displayed.

Further, a specification output key 78*a*, a virtual processing execution key 78*b*, a development target object information input key 78*c*, a stop key 78*d*, and a registration request key 78*e* are disposed in the information providing screen 70. The specification output key 78*a* is a key that is pressed (clicked) when a design specification is output. The virtual processing execution key 78*b* is a key pressed when displaying the operation of the work system 50 by the operation program 34 on the image display field 77. The development target object information input key 78*c* is a key that is pressed when inputting the information on the development target object. The stop key 78*d* is a key that is pressed when the current processing is stopped. The registration request key 78*e* is a key that is clicked when the development target object is registered in the ecosystem 10, and is displayed so that it can be pressed when the processing operation in the virtual space by the operation program 34 is normally performed. Here, when the development target object information input key 78*c* is pressed, the CPU 22 displays a development target object information input screen 80 on the display section 44.

Figure 6:
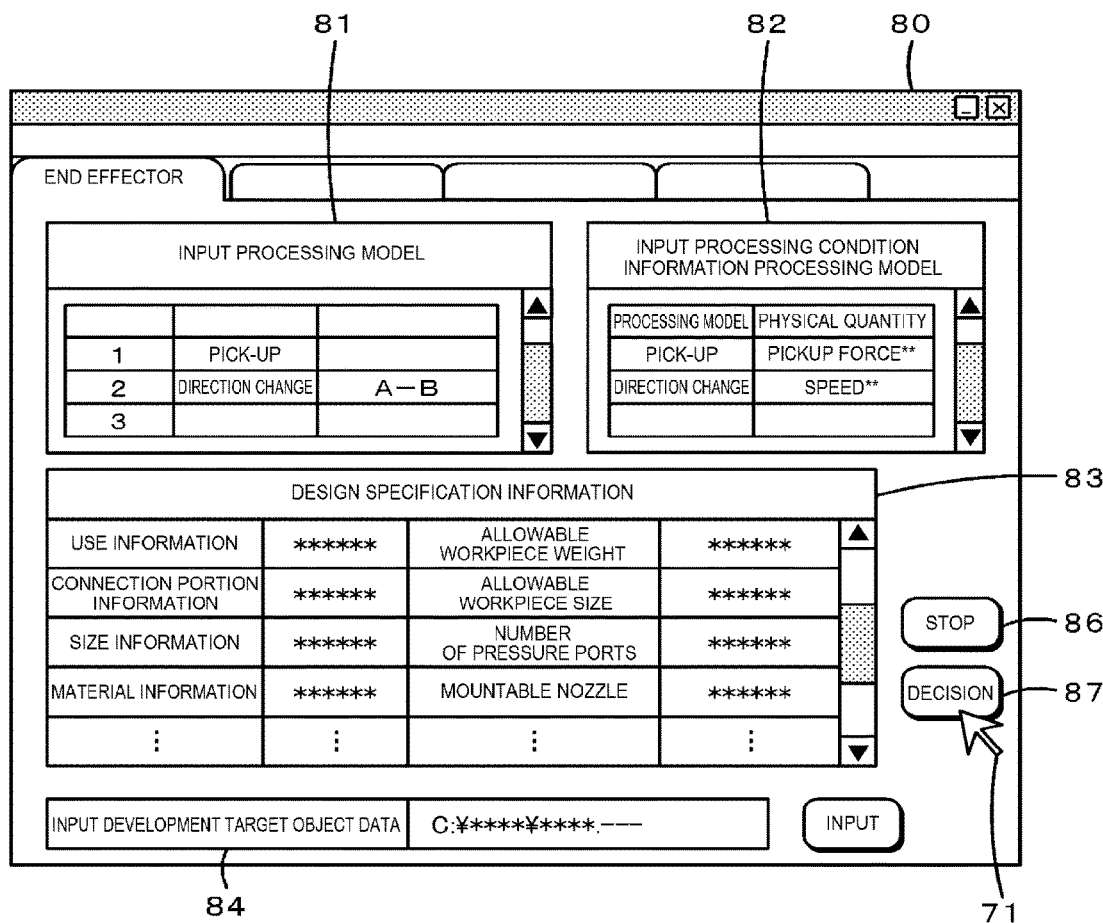
FIG. 6 is an explanatory view of a development target object information input screen 80.

FIG. 6 is an explanatory view of the development target object information input screen 80 displayed on the display section 44 of the design-use PC 40. The development target object information input screen 80 is superimposed and displayed on the information providing screen 70 when the development target object information input key 78*c* is pressed. A processing model input field 81, a processing condition information input field 82, a design specification information input field 83, a development target object data input field 84, an input key 85, a stop key 86, and a decision key 87 are disposed on the development target object information input screen 80. The processing model input field 81 is a field for inputting a processing model to be executed by a development target object as a command. The processing model input field 81 includes a processing model input field and a processing content input field of the processing model. When inputting a new processing model into the processing model input field 81, the developer describes the information defining the processing content to be executed by the processing model. For example, when adding the "direction change" as a new processing model, the developer defines the trajectory drawn by the workpiece W in accordance with the direction change, for example, the distance from the rotation shaft 64 or the information on the spatial range occupied at the time of the direction change of the workpiece W. The processing condition information input field 82 is a field for inputting the operation condition of the processing model and can input, for example, speed and acceleration in the movement processing, gripping force and suction force when picking up the workpiece W, and the like. When a new processing model is input, the developer defines a physical quantity (for example, a direction change angle, a direction change speed) defined in the processing model in the processing condition information input field 82. The design specification information input field 83 is a field for inputting design specification information of a new development target object. In the design specification information input field 83, when the development target object is a structure, information on the connection portion of the structure, information on the size, information on the material, and the like are input. In the design specification information input field 83, as physical specification information, information on the mass and size of the workpiece W that can be handled, the number of pressure ports that can be physically provided, the connection port thereof, and information (such as ID) of the mountable pickup member 66 are input. The development target object data input field 84 is a field for inputting three-dimensional CAD data of a structure created in advance, an application of a processing model, and the like, In the development target object data input field 84, the file name of the corresponding data is input. The stop key 86 and the decision key 87 are keys to be pressed when the input content is stopped and decided. The operator performs various necessary inputs to the information providing screen 70 and the development target object information input screen 80.

After S100, the CPU 22 inputs the data of the development target object (S110). For example, the CPU 22 may input data of a development target object input into the development target object information input screen 80. When the CPU 22 acquires the information on the structure in the development format and/or the information on the processing model in the development format from the design-use PC 40, the CPU 22 executes the predetermined conversion program and converts the information on the structure into the virtual processing format and/or the information on the processing model into the virtual processing format usable in the operation program 34. Next, the CPU 22 reads and acquires the selected device, processing model, and application from the device DB 31, peripheral DB 32, and the application DB 33 when the existing device (including peripheral device), processing model, or application is selected (S120). The developer selects the device, processing model, and application on the information providing screen 70. In addition, the CPU 22 performs a processing of connecting the read device and the development target object at a connection portion or processing of applying an application to the device, based on the mechanism section connection condition. When the device, processing model, or application is not selected, the CPU 22 omits this S120 and verifies the development target object independently. Next, the CPU 22 determines whether the processing condition information including the processing condition is acquired from the design-use PC 40 (S130), and when the processing condition is input, determines whether the operation is input based on whether the virtual processing execution key 78*b* is pressed (S140).

When an object is input in 5140, the CPU 22 executes the operation processing of the development target object in the virtual space (S150). At this time, when the development target object is configured independently, the CPU 22 executes the operation processing of the development target object in the virtual space in a state in which the processing condition is applied. Alternatively, when the development target object is in the state of the work system 50 incorporated in the main device or the peripheral device, the CPU 22 executes the operation processing of the work system 50 incorporating the development target object in the virtual space in the state of applying the processing condition. The CPU 22 applies the acquired processing condition to operate the development target object in the virtual space in the selected structure and a processing model related to the selected structure, and outputs the operation result as a moving image in the image display field 77. At this time, the CPU 22 performs calculations including whether dropping of the workpiece W or deviation of the gripping position occurs during movement in accordance with the gripping force or the mass of the workpiece W, and the like, when the workpiece W is moved at the speed or acceleration of the set processing condition. The CPU 22 also calculates whether the structure interferes (comes into contact) with other structures when the development target object is operated. In addition, the CPU 22 calculates the amount of time required for the processing when the set processing is executed. After S150, the CPU 22 determines whether the development target object operates normally based on the calculation result (S160). That is, the CPU 22 determines whether a predetermined processing operation to be executed by the development target object is performed normally in the virtual space. When the operation is not executed normally, the CPU 22 notifies the operator of its malfunction (S170), and executes processing from S110. The operator who has checked the malfunction corrects the development target object (or the work system 50) currently constructed, for example, by correcting the development target data such as the CAD data in S110 or changing the device or the peripheral device.

Figure 7A:
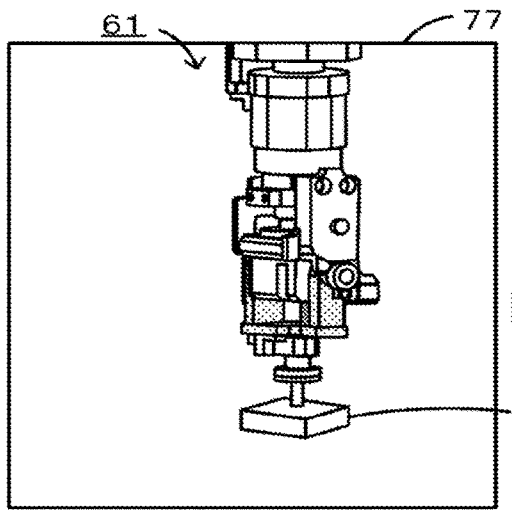
FIG. 7 is an explanatory view illustrating an operation of a direction change pickup section 61 in a virtual space.
Figure 7B:
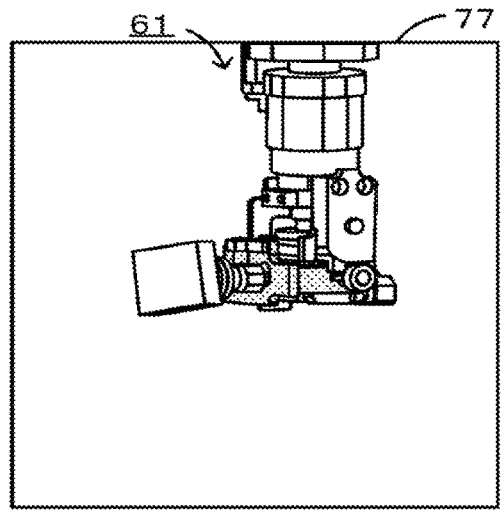
Figure 7C:
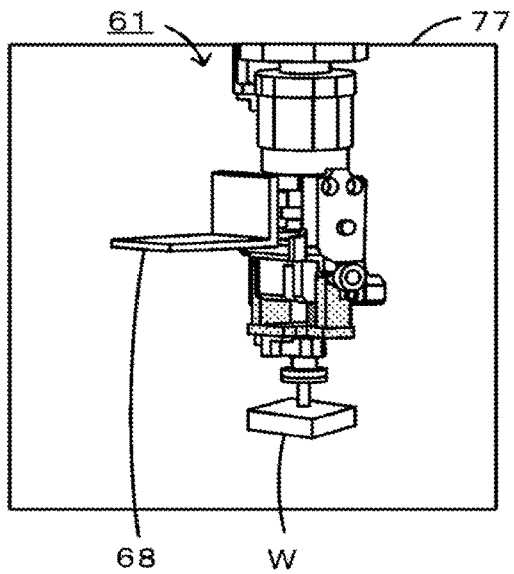
Figure 7D:
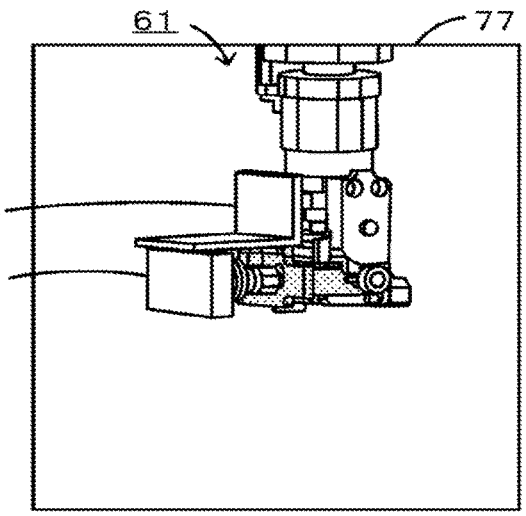

FIG. 7 is an explanatory view illustrating the operation of the direction change pickup section 61 in the virtual space, FIG. 7A is a view in which the workpiece W is picked up, FIG. 7B is a view in which the direction of the workpiece W is changed and a deviation occurs, FIG. 7C is a view in which a posture maintaining plate 68 is newly disposed, and FIG. 7D is an explanatory view in which the posture is maintained by the posture maintaining plate 68 when the direction of the workpiece W is changed. FIG. 7 is an explanatory view in which the operation of the direction change pickup section 61, which is a development target object, is independently verified. When the direction change pickup section 61 is operated under the set processing condition, it becomes clear that the workpiece W is deviated (FIG. 7B). Therefore, the developer corrects the development target object data by disposing the posture maintaining plate 68 and verifies the data by the operation program 34 again. As a result, the developer can check that the posture maintaining plate 68 can suppress the deviation of the workpiece W due to the direction change in the virtual space without manufacturing the actual object.

Figure 8A:
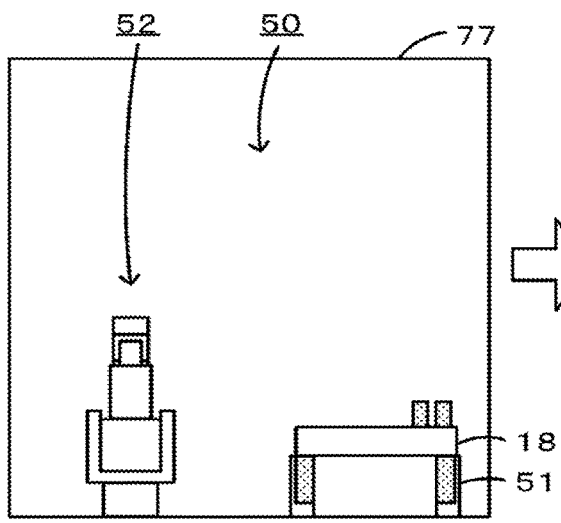
FIG. 8 is an explanatory view illustrating an operation of the work system 50 in the virtual space.
Figure 8B:
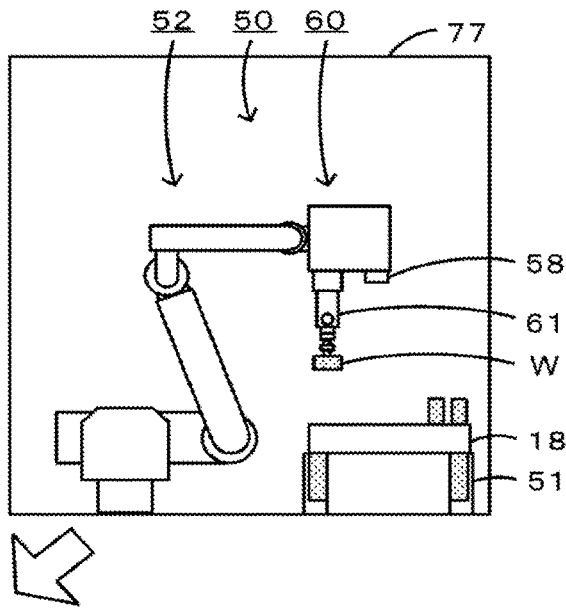
Figure 8C:
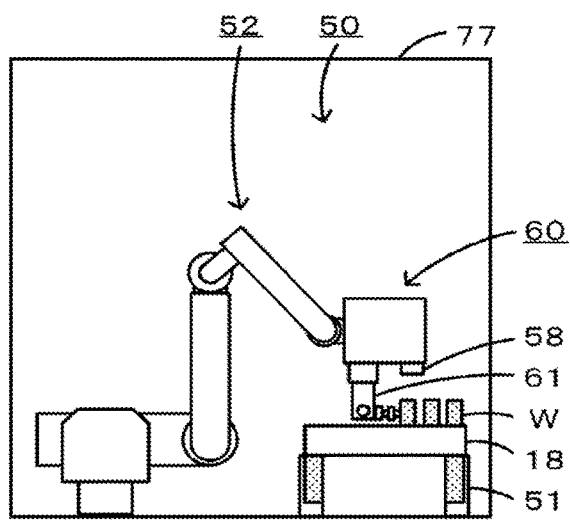

FIG. 8 is an explanatory view illustrating the operation of the work system 50 incorporating the direction change pickup section 61 in the virtual space, FIG. 8A is a view illustrating the pick-up of the workpiece W, FIG. 8B is a view illustrating the movement of the workpiece W, and FIG. 8C is a view illustrating the disposition of the workpiece W. When the arrangement device 52 moves or changes the direction of the workpiece W, such as when the gripping force is insufficient, the workpiece W may fall from the direction change pickup section 61. The developer sets the processing condition and operates the arrangement device 52 including the direction change pickup section 61 in the virtual space, so that it is possible to check in advance whether there is such a deviation or fall of the workpiece W before manufacturing the direction change pickup section 61. Further, in the ecosystem 10, even when it is checked that the work system 50 can operate normally, for example, it is possible to examine the total processing time, and it is possible to verify the optimum device environment without preparing an actual machine. Further, in the operation check of the work system 50 in the virtual space, for example, it is possible to examine the work at the time of switching the product type to another assumed type workpiece W. Furthermore, in the ecosystem 10, for example, by performing the operation check of the work system 50 in the virtual space in a state where an application for optimizing the supply conditions of the workpiece W of the supply device 54 is incorporated, it is possible to verify efficiency such as shortening the processing time.

On the other hand, when the development target object (or the work system 50) normally operates in S160, the CPU 22 permits the development target object to be registered in the ecosystem 10 (S180). The CPU 22 permits registration by displaying the registration request key 78e of the information providing screen 70 in an operable manner. Next, the CPU 22 determines whether the registration request has been acquired based on whether the registration request key 78e has been pressed (S190), and when the registration request has been acquired, the CPU 22 acquires the design specification information of the development target object based on the content input in the design specification information input field 83 (S200). The CPU 22 then registers the development target object in the ecosystem 10 (S210). At the time of registration, the CPU 22 assigns an ID to the development target object and performs processing of adding the information and data to any of the device DB 31, the peripheral device DB 32, and the application DB 33 according to the development target object. The registered development target object can be selected on the information providing screen 70.

After S210, if no processing condition is input in S130, if no operation is input in S140, or if a registration request has not been acquired in S190, the CPU 22 determines whether processing end has been input (S220). It is assumed that the CPU 22 makes this determination based on whether an operation to close the information providing screen 70 has been performed. When processing end is not input, the CPU 22 executes processing from S110. That is, a change of the development target object is input as necessary, an operation processing in the virtual space is performed, and the result is displayed and output in the image display field 77. On the other hand, when the processing end is input in S220, the CPU 22 ends this routine. In this manner, the developer can check in advance the operation of the development target object alone or the operation when the development target object is applied to the work system 50, without making a prototype of the development target object, by executing the operation program 34.

Figure 9:
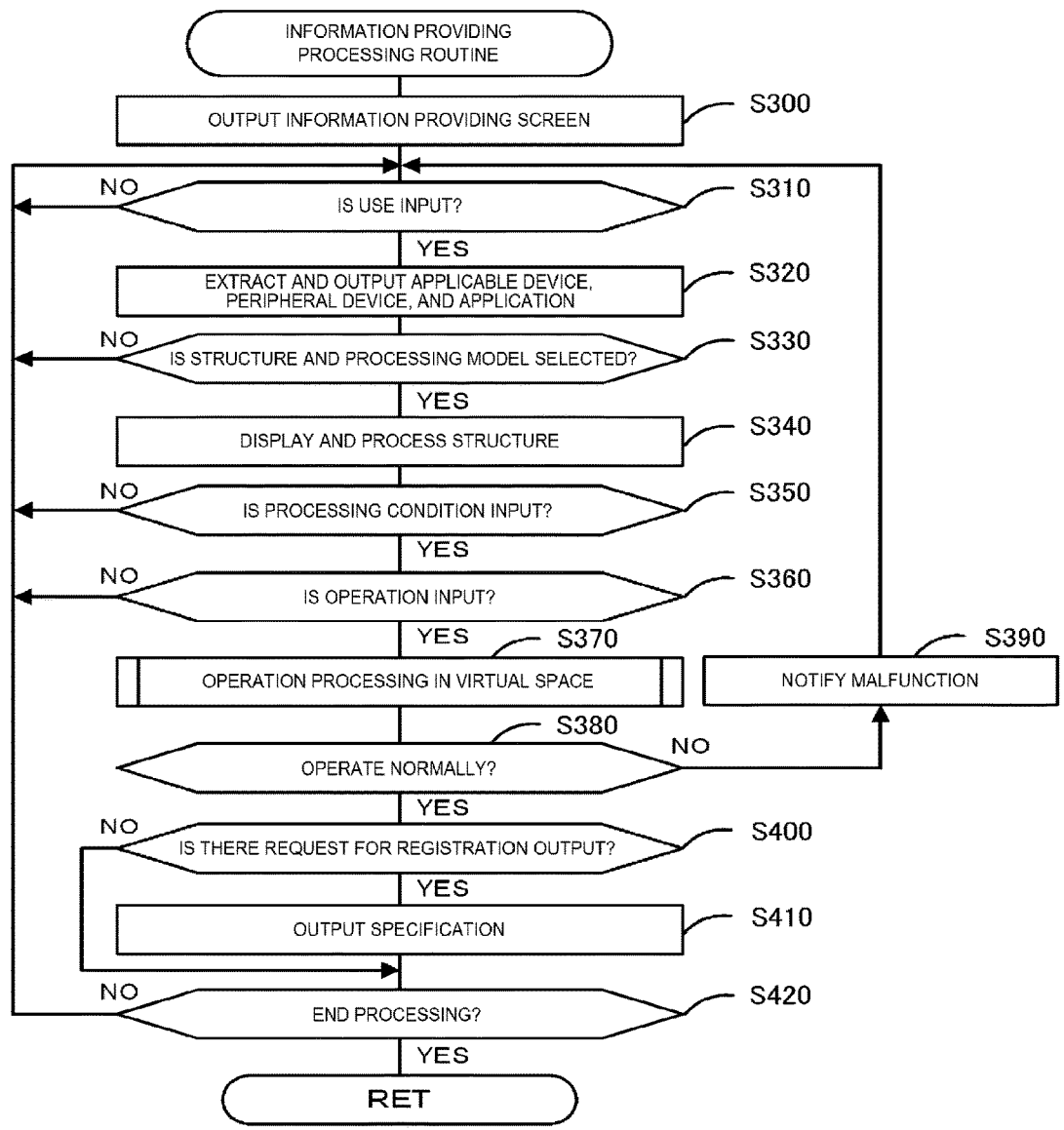
FIG. 9 is a flowchart illustrating an example of an information providing processing routine.

Next, the operation of the ecosystem 10, in particular, the processing of providing information on the automation by the work robot to the customer will be described. Here, the processing in which the information providing device 20 provides information based on the information acquired from the shop PC 16 will be mainly described. The processing performed when the information providing device 20 constructs the work system 50 (see FIG. 2) will be described as a specific example. FIG. 9 is a flowchart illustrating an example of an information providing processing routine executed by the CPU 22 of the information providing device 20. This routine is stored in the storage section 23 and executed in response to a start instruction from the operator of the shop 15. When this routine is started, the CPU 22 of the control device 21 outputs the information providing screen 70 (see FIG. 5) to the shop PC 16 (step S300).

After S300, the CPU 22 determines whether the use of the work system 50 is already input based on the content of the input into the use input field 72 (S310), When the system use is already input, the CPU 22 extracts a structure, processing model, and application compatible with the input use and outputs them to the shop PC 16 (S320). The CPU 22 extracts a structure, processing model, and application using the device DB 31, the peripheral device DB 32, and the application DB 33. The CPU 22 utilizes the extracted information for the display control of the information providing screen 70 on the shop PC 16. The CPU 22 then determines whether a structure (device) and a processing model related to the structure have been selected (S330) and, if a structure and processing model have been selected, the CPU 22 then displays and processing the structure (S340). At this time, when multiple structures are selected, these are displayed in the image display field 77 in a connected state. When an application is selected, the application is applied to the device or the peripheral member in the subsequent processing. Subsequently, the CPU 22 determines whether the processing condition is already input based on whether the processing condition information including the processing condition is acquired from the shop PC 16 (S350), and when the processing condition is already input, the CPU 22 determines whether the operation processing of the work system 50 is input based on whether the virtual processing execution key 78b is pressed (S360). If a structure or processing model is not selected to the extent that the work system 50 can operate, a negative determination may be given in S360.

When the operation is input in S360 mode, the CPU 22 executes the operation processing of the work system 50 in the virtual space (S370), determines whether the work system 50 operates normally (S380), notifies the malfunction (S390) when the operation is not operating normally, and the processing from S310 level is executed. In the processing of S370 to S390, the CPU 22 performs the same processing as S150 to S170 of the development target object processing routine, On the other hand, when the work system 50 normally operates in S380 (see, for example, FIG. 8), the CPU 22 determines whether the output request of the design specification has been input based on whether the specification output key 78a has been pressed (S400). When an output request for the design specification is input, the CPU 22 outputs the design specification information including the design specification information to the shop PC 16 (S410). The shop PC 16 may print out the design specification included in the design specification information. The CPU 22 determines whether the processing end of the information provision is input based on the input of the information providing screen 70 (S420) and ends the routine when the processing end is input. On the other hand, when the end of processing has not been input in S420, when the use of the system has not been input in S310, when the structures and processing models have not been selected in S330, when the processing condition has not been input in S350, or when the operation has not been input in S360, the CPU 22 executes processing from S310. In the shop 15, the customer can check the moving image displayed on the information providing screen 70 to see how the processing is executed in the virtual space when multiple structures are combined based on the output processing result without actually manufacturing and purchasing the work system 50.

Here, the correspondence relationship between the constituent elements of the present embodiment and the constituent elements of the present disclosure will be clarified. The storage section 23 of the present embodiment corresponds to the storage section of the present disclosure, the CPU 22 corresponds to the control section, and the arrangement device 52 corresponds to the work robot. In the present embodiment, an example of the information providing method of the present disclosure is also clarified by explaining the operation of the information providing device 20.

The information providing device 20 of the present embodiment described above has the operation program 34 for executing the processing of the processing model by the structure in the virtual space by using the information on the structure related to the arrangement device 52 (work robot) and the information on the processing model related to the structure. The information providing device 20 acquires data of a development target object including at least one of a new structure and a new processing model from the design-use PC 40 (information processing device) used by a developer, executes processing by the development target object in the virtual space by the operation program 34 using the acquired data of the development target object, and displays and outputs the processing result by the development target object. Developers can check in the virtual space how a development target object executes processing based on the output processing result without actually producing a structure. Therefore, in the information providing device 20, development of a structure and a processing model used for the work system 50 can be more easily executed.

In addition, the control device 21 acquires processing condition information including the processing condition of the development target object and executes the processing by the development target object in the virtual space in a state where the acquired processing condition is applied. In the information providing device 20, since the processing based on the processing condition is executed in the virtual space, the operator can check various processing states of the development target object by changing the processing condition or the like. The information providing device 20 further includes the storage section 23 for registering and storing information on two or more structures and information on a processing model related to the structures, and the control device 21 executes the work system 50 using the acquired development target object and the structure and/or the processing model registered in the storage section 23 in the virtual space by executing the operation program 34. In the information providing device 20, it is possible to check how the development target object executes the processing on the work system in the virtual space based on the output processing result. Further, the control device 21 can also execute the processing by the development target object in the virtual space by acquiring data of the new processing model as the information on the development target object, incorporating the acquired new processing model into the structure registered in the storage section 23, and executing the operation program 34. The control device 21 can also execute the processing by the development target object in the virtual space by acquiring the data of the new structure as the information on the development target object, incorporating the processing model registered in the storage section 23 into the new structure, and executing the operation program 34. The information providing device 20 can provide an environment in which, for example, development of adding a new processing model to an existing structure or development of a new structure using the existing processing model is easily performed.

When the operation of the development target object in the virtual space is normally performed by the operation program 34, the control device 21 registers the information on the development target object in the storage section 23 in a state in which it is usable by the operation program 34 and in a state in which it can be selected. In this the information providing device 20, since a new development target object (structure and processing model) is registered and the other developers and customers can use the development target object, it is possible to effectively utilize the development resource. When the operation of the development target object in the virtual space is normally performed, the control device 21 registers the design specification information of the development target object based on the information on the development target object. The information providing device 20 can easily manufacture a development target object by using the registered design specification information. Further, since the information providing device 20 converts the data in the development format developed in the development environment of each developer into the data in the virtual processing format usable in the ecosystem 10, the developer can easily develop a new structure or processing model.

In addition, since the structure includes at least one of a work robot, a supply device, a conveyance device, an imaging device, a end effector, and portions thereof, the information providing device 20 can check the processing state and the like of each of the above-mentioned structures in the virtual space. Further, since the information on the structure includes at least one of shape data, structure condition data, and material data, in the information providing device 20, by defining the shape, structure condition, and material, the structure corresponding to the content of the data can be executed in the virtual space. Furthermore, since the processing model includes at least one of movement processing, pick-up processing, arrangement processing, direction conversion processing, incorporation processing, image capturing processing, and image processing, using the workpiece W, the information providing device 20 can check these processing in the virtual space.

It is to be understood that the present disclosure is not limited to the embodiments described above in any way, and may be executed in various forms as long as the embodiments belong to the technical scope of the present disclosure.

For example, in the embodiment described above, the control device 21 executes the operation of the development target object in the virtual space by the operation program 34, outputs the processing result as a moving image, and outputs the determination result of whether the processing has been normally executed, but may output the processing result only as a moving image, or may output only the determination result. With any of these information providing devices 20, it is possible to more easily execute development of a device used for a work system.

In the embodiment described above, the design specification information of the development target object is registered when the operation of the development target object in the virtual space is normally performed, but the registration of the design specification information may be omitted. The information providing device 20 can also more easily execute development of a device used for a work system.

In the embodiment described above, the control device 21 converts the data in the development format into the data in the virtual processing format, but this data conversion may be omitted as the data in the virtual processing format is accepted.

In the embodiment described above, the present disclosure has been described as the information providing device 20 that executes the operation processing by the operation program 34, but the present disclosure is not particularly limited to this, and the present disclosure may be an information providing method or an information providing program. In particular, the present disclosure may be executed not only as the information providing device 20 but also as a cloud. In the embodiment described above, the CPU 22 of the information providing device 20 executes the operation program to execute the processing by the development target object in the virtual space, but the present disclosure is not limited to this, and the CPU 42 of the design-use PC 40 may execute the operation program to execute the processing by the development target object in the virtual space. For example, the design-use PC 40 may function as an information providing device.

Here, in the information providing device of the present disclosure, the control section may acquire processing condition information including a processing condition of the development target object, and execute processing by the development target object in the virtual space in a state where the acquired processing condition is applied. In this information providing device, since the processing based on the processing condition is executed in the virtual space, the operator can check various processing states of the development target object by changing the processing condition or the like. Here, the "processing condition" include, for example, physical quantities used in processing, and specifically, size, mass, speed, acceleration, pressure, current, voltage, energy, time, and the like.

The information providing device of the present disclosure may include a storage section for registering and storing information on two or more structures and information on a processing model related to the structures, and the control section may execute the work system using the acquired development target object and the structure and/or the processing model registered in the storage section in the virtual space by executing the operation program. In this information providing device, it is possible to check how the development target object executes the processing on the work system of the virtual space based on the output processing result.

The information providing device of the present disclosure may include a storage section for registering and storing information on two or more structures and information on the processing model related to the structures, and the control section may execute processing by the development target object in the virtual space by acquiring data of the new processing model as information on the development target object and executing the operation program by incorporating the acquired new processing model into the structure registered in the storage section, or may execute processing by the development target object in the virtual space by acquiring data of the new structure as information on the development target object and executing the operation program by incorporating the processing model registered in the storage section into the new structure. The information providing device can provide an environment in which, for example, development of adding a new processing model to an existing structure or development of a new structure using the existing processing model is easily performed.

The information providing device of the present disclosure may include a storage section for registering and storing information on two or more structures and information on the processing model related to the structures, and the control section may register information on the development target object in the storage section in a usable and selectable state in the operation program when an operation of the development target object in the virtual space is normally performed by the operation program. In this information providing device, a new development target object (structure and processing model) can be registered and other developers and customers can use the development target objects, so development resources can be utilized more efficiently.

In the information providing device of the present disclosure, the control section may register design specification information of the development target object based on the information on the development target object when an operation of the development target object in the virtual space is normally performed. In this information providing device, a development target object can be easily manufactured by using the registered design specification information.

In the information providing device of the present disclosure, the control section may acquire information on the structure in a development format and/or information on the processing model in a development format from the information processing device, and convert the information into information on the structure in a virtual processing format and/or information on the processing model in the virtual processing format that is usable in the operation program. In this information providing device, since what has been developed in the development environment of each developer is converted into a format that is usable in the system of the present disclosure, it is easy for the developer to develop a new structure or a new processing model.

In the information providing device of the present disclosure, the structure may include at least one of the work robot, a supply device, a conveyance device, an imaging device, an end effector for executing processing on the workpiece, and a portion thereof. In this information providing device, the processing state and the like of each of the structures can be checked in the virtual space.

In the information providing device of the present disclosure, the information on the structure may include at least one of shape data, structure condition data, and material data. In this information providing device, by defining a shape, a structure condition, and a material, a structure in accordance with the content of the data can be executed in the virtual space.

In the information providing device of the present disclosure, the processing model may include at least one of movement processing, pick-up processing, arrangement processing, direction conversion processing, incorporation processing, image capturing processing, and image processing, using the workpiece. In this information providing device, these processing can be checked in the virtual space.

The information providing method of the present disclosure is an information providing method used in a work system including a work robot for performing a predetermined work on a workpiece, in which an operation program that executes processing of a processing model in a virtual space by using information on a structure related to the work robot and information on the processing model related to the structure exists, the information providing method including: (a) a step of acquiring data of a development target object including at least one of a new structure and a new processing model from an information processing device used by a developer; (b) a step of executing the operation program, using the acquired data of the development target object, which executes processing by the development target object in the virtual space; and (c) a step of outputting a processing result executed in the virtual space by the development target object.

In this information providing method, similarly to the above-described information providing device, the developer can check how the development target object executes processing in the virtual space based on the output processing result without actually producing a structure. Therefore, in this information providing device, development of a structure and a processing model used for a work system can be more easily executed. In this information providing method, the above-mentioned aspect of the information providing device may be adopted, or the above-mentioned step of expressing the function of the information providing device may be included.

In the program of the present disclosure, each step of the information providing method described above is executed by at least one computers. The program may be recorded on a computer-readable recording medium (such as hard disk, ROM, FD, CD, DVD), transmitted from one computer to another through a transmission medium (communication network such as the Internet or a LAN), or exchanged in any other manner, When the program is executed by one computer or by multiple computers share each step and execute, since each step of the information providing method described above is executed, so that the same operation and effect as those of the method can be obtained.

INDUSTRIAL APPLICABILITY

The information providing device, the information providing method, and the program disclosed in the present specification is usable in the technical field of a device that executes a predetermined work on a workpiece.

REFERENCE SIGNS LIST

10 ecosystem; 11 network; 12 LAN; 15 store; 16 shop PC; 18 disposing member; 20 information providing device; 21 control device; 22 CPU; 23 storage section; 24 display section; 25 input device; 26 communication section; 31 device DB; 32 peripheral device DB; 33 application DB; 34 operation program; 40 design-use PC; 41 control device; 42 CPU; 43 storage section; 44 display section; 45 input device; 46 communication section; 50 work system; 51 conveyance device; 52 arrangement device; 52a control device; 53 base; 54 supply device; 55 arm member; 55a first arm member; 55b second arm member; 55c third support section; 57 pedestal section; 58 imaging device; 59 connecting section; 60 end effector; 61 direction change pickup section; 62 connecting section; 63 first member; 64 rotation shaft; 65 second member; 66 pickup member; 67 external pipe; 68 posture maintaining plate; 70 information providing screen; 71 cursor; 72 use input field; 73 device input field; 74 peripheral device input field; 75 application input field; 76 workpiece input field; 77 image display field; 78a specification output key; 78b virtual processing execution key; 78c development target object information input key; 78d stop key; 78e registration request key; 80 development target object information input screen; 81 processing model input field; 82 processing condition information input field; 83 design specification information input field; 84 development target object data input field; 86 stop key; 87 decision key; W workpiece

The invention claimed is:

1. An information providing device used in a work system that includes a work robot that performs predetermined work on a workpiece, the information providing device comprising:
a memory storing an operation program that, when executed, uses information on a structure related to the work robot and information on a processing model related to the structure to execute the processing model in a virtual space; and
control circuitry configured to
acquire, from an information processing device of a developer, data of a development target object, the acquired data including data of at least one of a new structure and a new processing model,
execute the operation program by using the acquired data of the development target object to execute processing of the development target object in the virtual space, and
output a processing result of the development target object,
wherein the control circuitry is further configured to determine whether an operation of the development target object in the virtual space was performed with an error, and when determining that the operation was performed with the error, display an input screen allowing the developer to enter modified data of a static physical property of the new structure of the development target object, and execute the operation program again using the modified data of the static physical property of the new structure.

2. The information providing device according to claim 1, wherein the control circuitry is further configured to acquire processing condition information including a processing condition of the development target object, and execute processing by the development target object in the virtual space in a state in which the acquired processing condition is applied.

3. The information providing device according to claim 1, wherein the memory stores information on two or more structures and corresponding information on processing models related to the two or more structures, and wherein the control circuitry is further configured to execute the work system using the acquired development target object and the two or more structures and/or the processing models stored in the memory in the virtual space by executing the operation program.

4. The information providing device according to claim 1, wherein the memory stores information on two or more structures and corresponding information on processing models related to the two or more structures, and wherein the circuitry is further configured to execute processing of the development target object in the virtual space by acquiring data of the new processing model as information on the development target object and execute the operation program by incorporating the new processing model into the structure two or more structures stored in the memory, or perform processing of the development target object in the virtual space 1w acquiring data of the new structure as information on the development target object and execute the operation program by incorporating the processing model stored in the memory into the new structure.

5. The information providing device according to claim 1, wherein the memory stores information on two or more structures and corresponding information on processing models related to the two or more structures, and wherein the control circuitry is further configured to register information on the development target object in the memory in a state in which the information on the development target object is, usable by the operation program, when the operation of the development target object in the virtual space was performed without the error by the operation program.

6. The information providing device according to claim 1, wherein the control circuitry is further configured to register design specification information of the development target object based on the information on the development target object, when the operation of the development target object in the virtual space was performed without the error.

7. The information providing device according to claim 1, wherein the control circuitry is further configured to acquire information on the structure in a development format and/or information on the processing model in the development format from the information processing device, and convert the information into information on the structure in a virtual processing format and/or information on the processing model in the virtual processing format that is usable by the operation program.

8. The information providing device according to claim 1, wherein the structure includes at least one of the work robot, a supply device, a. conveyance device, an imaging device, and an end effector for executing processing on the workpiece, and a portion thereof.

9. The information providing device according to claim 1, herein the information on the structure includes at least one of shape data, structure condition data, and material data.

10. The information providing device according to claim 1, wherein the processing model includes at least one of movement processing, pick-up processing, arrangement processing, direction conversion processing, incorporation processing, image capturing processing, and image processing, using the workpiece.

11. The information providing device of claim 1, wherein the control circuitry is further configured to acquire, as the modified data, data of a static physical property of the work robot or a static physical property of a peripheral device attached to the work robot.

12. An information providing method used in a work system that includes a work robot for performing predetermined work on a workpiece, in which a memory stores an operation program that executes processing of a processing model in a virtual space by using information on a structure related to the work robot and information on the processing model related to the structure exists, the information providing method comprising:

acquiring, from an information processing device of a developer, data of a development et object, the acquired data including data of at least one of a new structure and a new processing model;

executing the operation program, using the acquired data of the development target object to execute processing of the development target object in the virtual space; and outputting a processing result executed in the virtual space of the development target object, wherein the method further includes determining whether an operation of the development target object in the virtual space was performed with an error, and when determining that the operation was performed with the error, displaying an input screen allowing the developer to enter modified data of a static physical property of the new structure of the development target object, and executing the operation program again using the modified data of the static physical property of the; new structure.

13. A non-transitory computer-readable medium storing a program that, when executed by processing circuitry, causes the processing circuitry to execute the steps of the information providing method according to claim 12.

* * * * *